(12) United States Patent
Halfmann et al.

(10) Patent No.: US 8,532,677 B2
(45) Date of Patent: Sep. 10, 2013

(54) MODEL BASED CHANNEL STATE INFORMATION FEEDBACK

(75) Inventors: Ruediger Halfmann, Otterberg (DE); Thomas Haustein, Potsdam (DE); Egon Schulz, München (DE); Wolfgang Zirwas, München (DE)

(73) Assignee: Nokia Siemens Networks GmbH & Co., Munich (DE)

( * ) Notice: Subject to any disclaimer, the term of this patent is extended or adjusted under 35 U.S.C. 154(b) by 46 days.

(21) Appl. No.: 13/144,190

(22) PCT Filed: Jan. 13, 2009

(86) PCT No.: PCT/EP2009/050292
§ 371 (c)(1),
(2), (4) Date: Jul. 12, 2011

(87) PCT Pub. No.: WO2010/081535
PCT Pub. Date: Jul. 22, 2010

(65) Prior Publication Data
US 2011/0269481 A1    Nov. 3, 2011

(51) Int. Cl.
*H04W 24/00* (2009.01)
(52) U.S. Cl.
USPC ............... 455/456.6; 455/440; 455/422.1; 455/67.11; 455/450; 455/502; 370/329; 370/350
(58) Field of Classification Search
USPC ............ 455/436, 456.1–457, 450–452.2, 455/67.11–67.16, 440–441; 370/329, 350
See application file for complete search history.

(56) References Cited

U.S. PATENT DOCUMENTS

| 5,802,473 | A  | * | 9/1998  | Rutledge et al. | 455/446 |
| 6,657,988 | B2 | * | 12/2003 | Toskala et al.  | 370/350 |
| 6,999,728 | B2 | * | 2/2006  | Delaveau et al. | 455/67.16 |
| 7,164,883 | B2 | * | 1/2007  | Rappaport et al.| 455/3.01 |
| 7,239,879 | B2 | * | 7/2007  | Avidor et al.   | 455/456.5 |
| 8,260,305 | B2 | * | 9/2012  | Li              | 455/440 |
| 8,290,499 | B2 | * | 10/2012 | Rappaport et al.| 455/446 |
| 2003/0023412 | A1 | * | 1/2003 | Rappaport et al.| 703/1 |
| 2004/0001462 | A1 | * | 1/2004 | Yavuz et al.    | 370/333 |
| 2005/0002326 | A1 | * | 1/2005 | Ling et al.     | 370/208 |
| 2005/0065713 | A1 | * | 3/2005 | Yamada et al.   | 701/200 |

(Continued)

FOREIGN PATENT DOCUMENTS

WO  WO2007/121568 A1  11/2007
WO  WO2008/009157 A1   1/2008

OTHER PUBLICATIONS

3GPP TS 36.300, V8.0.0 (Mar. 2007), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 82 pgs.

*Primary Examiner* — Sharad Rampuria
(74) *Attorney, Agent, or Firm* — Harrington & Smith

(57) ABSTRACT

The proposed methods and devices provide a new technique for feeding back CSI information of a channel between a network element and a user equipment to the network element by feeding back a location of the user equipment. The new technique opens completely new options for multi user scheduling and channel prediction. According to embodiments, a proposed user equipment configuration is indicated to the user by the user equipment.

19 Claims, 4 Drawing Sheets

(56) References Cited

U.S. PATENT DOCUMENTS

| | | | |
|---|---|---|---|
| 2006/0019679 A1 | 1/2006 | Rappaport et al. | 455/456.5 |
| 2006/0293066 A1 | 12/2006 | Edge et al. | 455/456.3 |
| 2007/0287476 A1* | 12/2007 | Jeong et al. | 455/456.6 |
| 2008/0032708 A1* | 2/2008 | Guvenc et al. | 455/456.2 |
| 2009/0316567 A1* | 12/2009 | Larsson | 370/201 |
| 2010/0069070 A1* | 3/2010 | Shi et al. | 455/436 |
| 2010/0202543 A1* | 8/2010 | Raif et al. | 375/260 |
| 2011/0131461 A1* | 6/2011 | Schulz et al. | 714/749 |
| 2011/0235607 A1* | 9/2011 | Haustein et al. | 370/329 |
| 2012/0108257 A1* | 5/2012 | Kwon et al. | 455/452.1 |
| 2012/0155366 A1* | 6/2012 | Zirwas et al. | 370/312 |

\* cited by examiner

MODEL BASED CHANNEL STATE INFORMATION FEEDBACK

FIELD OF INVENTION

The present invention relates to the field of determining channel state information (CSI) of a communication channel between a user equipment and a network element.

ART BACKGROUND

Channel estimation for broadband mobile radio systems is generally a challenge due to a large time variance and frequency selectivity of the radio channels in case of fast moving user equipments (UEs). Due to its importance, feedback overhead reduction has been investigated for a long time and has resulted in quite a number of proposals. The most prominent for OFDM(A) systems are:

a) use interpolation in time and frequency leads to a reduced number of CSI estimates, which have to be fed back.
b) codebook based precoding is a technique where instead of the full CSI information only a 'parameterized' feedback is being used, which maximizes overall system performance.
c) apply tracking algorithms: there are quite advanced tracking algorithms, especially in combination with codebook based precoding, which have reduced feedback overhead to an level, where COOPA techniques are at least possible.
d) application of subspace based feedback reduction techniques try to adapt feedback to the subspace dimension of the radio channel. The feedback is than only fed back regularly within the subspace dimensions, which will be typically quite smaller than the full dimension.
e) Prediction techniques try to estimate future radio channels based on the past development of the radio channels.

All these techniques exploit correlations of the radio channel in frequency and time domain. As long as this correlation is high, there will be also a significant reduction in feedback overhead. Difficult to handle are situations with high time as well as frequency variance.

In view of the above-described situation, there exists a need for an improved technique that enables to efficiently determine and feed back channel state information, while substantially avoiding or at least reducing one or more of the above-identified problems.

SUMMARY OF THE INVENTION

This need may be met by the subject matter according to the independent claims. Advantageous embodiments of the present invention are described by the dependent claims.

According to a first aspect of the invention there is provided a method of operating a user equipment (UE) in order to enable a network element to determine channel state information (CSI) of a communication channel between the UE and the network element, the method comprising (i) determining a location of the UE, and (ii) transmitting the location of the UE to the network element.

This aspect of the invention is based on the idea to feed back from UE to network elements instead of the radio channel itself an UE location which allows the network element to determine the channel state information.

Herein, according to an embodiment, the location of the UE is a three dimensional location. According to another embodiment, the location of the UE is two dimensional location. For example, if it is assumed that the UE has a typical, predetermined height, e.g. 1.5 meter (m), a two-dimensional location specification is sufficient.

Herein, the term "communication" covers all kinds of communication, e.g. signalling, voice communication, data communication, etc.

According to an embodiment, the communication channel is a wireless communication channel, e.g. a communication channel of a cellular communication network. However, according to other embodiments, other channel types, such as a wired communication channel, are also possible.

Examples of user equipment are a mobile phone, a cellular phone, a mobile computer, a personal digital assistent (PDA), etc.

According to an embodiment, the network element is a stationary network element. According to a further embodiment, the network element is a base station of a communication network, e.g. of a cellular communication network, e.g. an enhanced nodeB (eNB). According to a further embodiment, the network element as defined herein includes at least part of a controller of a base station of a communication network. According to a further embodiment, the network element as defined herein includes a base station of a communication system and at least part of its controller. According to an embodiment the communication system is a cellular communication system. According to a further embodiment, the controller of the base station is a radio network controller (RNC).

According to an embodiment the network element and the UE are part of a cooperative antenna system (COOPA). In this case, feeding back the location of the UE results in an even higher efficiency due to the higher number of radio channels for which the channel state information must be estimated.

It should be understood that "transmitting the location of the UE" embraces any kind of transmittance which in effect transmits the location of the UE, e.g. a location signal indicative of the location of the UE. The location of the UE may for example be the location specified in coordinates of a chosen coordinate system, e.g. a cartesian coordinate system or spherical coordinates. It should further be understood that herein the location of the UE is subject to a determination error and hence "determining a location" means determining a location with a certain error.

According to an embodiment, determining a location of the UE comprises determining a location of the UE on the basis of local surrounding data (model data) describing a surrounding of the network element. According to a further embodiment, the local surrounding data describe a surrounding between the network element and the UE. According to an embodiment, the local surrounding data is a local building vector data map (BVDM). According to an embodiment, the local surrounding data is static. For example, the local surrounding data may include or consist of measured, pre-stored data. According to other embodiments, the local surrounding data is dynamic, i.e. timely varying. For example, according to an embodiment, the local surrounding data may include pre-stored data and adaptive learning corrections, e.g. corrections which are updated upon certain situations or in regular time intervals, e.g. every second.

According to a further embodiment, determining a location of the UE comprises determining a coarse position of the UE and determining the location of the UE on the basis of the coarse position.

For example, according to a further embodiment, the coarse position is determined on the basis of global positioning system (GPS).

According to a still further embodiment, the method comprises determining a coarse position of the UE and determining the location of the UE on the basis of local surrounding data (model data) describing a surrounding of the coarse position.

According to a further embodiment, determining a location of the UE comprises determining an estimated CSI based on reference signals received by the UE; determining a raytraced CSI by a ray tracing method taking into account the local surrounding data; and determining the location of the UE as the location for which the difference between the estimated CSI and the raytraced CSI is minimal.

According to a further embodiment, the method comprises determining an delay of reference signals received by the UE; calculating a signal delay due to reflections on the surrounding defined by the local surrounding data; and determining the location of the UE from the differences between the determined delay of reference signals and the calculated signal delay. According to a further embodiment, the delay of multipath components of reference signals of a channel, e.g. of a single channel, is determined and compared with a respective calculated signal delay in order to determine the location of the UE. According to a further embodiment, the delay of reference signals received from different network elements is determined and compared with a respective calculated signal delay in order to determine the location of the UE.

According to a further embodiment, the method comprises receiving the local surrounding data from the network element. For example, in a cellular communication system, the local surrounding data may be received once upon entering a cell or repeatedly as long as the UE is located in a cell of the network element.

According to a further embodiment, the method comprises indicating an antenna pattern of the UE to the network element. According to a further embodiment, the antenna pattern of the UE is indicated to the network element during connection setup, e.g. by transmitting a respective message to the network element. The knowledge of the antenna pattern together with the surrounding data and the location of the UE allows the network element to calculate the overall resulting channel impulse response by well known raytracing algorithms.

According to a further embodiment, the method comprises determining a moving vector containing an estimated speed and direction of the UE; and transmitting the moving vector to the network element. Transmitting a moving vector to the network element may enable the network element to perform a prediction of the channel over a relatively large time period.

According to a further embodiment, the method comprises determining a comparison value of a quantity, as for example the channel impulse response, by taking into account the location of the UE; measuring a value of the quantity; determining difference data defining the differences between the measured value and the comparison value of the quantity; transmitting the difference data to the network element. In this way, information concerning e.g. moving objects not included in surrounding data distributed by the network element may be fed back by the UE. The difference data may be used by the network element to update the local surrounding data.

According to a further embodiment of the first aspect, the method comprises receiving from the network element a proposed UE configuration information indicating a proposed UE configuration with better radio conditions; and indicating the proposed UE configuration to a user. This enables a user to configure the UE in the configuration with better radio conditions. Herein, an improved radio condition is a radio condition which is improved over an actual radio condition. Further herein, a proposed UE configuration may be for example at least one of a proposed UE position, a proposed UE antenna configuration, a proposed UE antenna position, a proposed UE antenna setup, and a proposed UE communication timing.

For example, according to a further embodiment of the first aspect, the method comprises receiving from the network element a proposed position information indicating a proposed location with better radio conditions; and indicating the proposed location to a user. This enables a user to move the UE to a location with better radio conditions.

According to a second aspect of the herein disclosed subject matter, a method of operating a network element is presented, the method comprising receiving from a UE a location of the UE; and determining a channel state information from a local surrounding data and the location of the UE.

According to an embodiment of the second aspect, the method comprises altering the local surrounding data on the basis of feedback data received from the UE. Such feedback data may be any data which enable the network element to update the local surrounding data. For example, the feedback data my be difference data indicating a difference in a quantity, e.g. the channel impulse response, between a calculated comparison value and a respective measured value. The calculated comparison value may e.g. be determined by taking into account at least one of: the location of the UE, the local surrounding data, etc.

According to a further embodiment of the second aspect, the method comprises determining a temporal prediction of channel state information from local surrounding data, the location of the UE and a moving vector containing an estimated speed and direction of the UE.

According to a further embodiment of the second aspect, the method comprises scheduling transmissions to different UEs by taking into account a temporal prediction of the channel state, so as to transmit to the UE's at times of good channel condition to the UE. To this end, in one embodiment, the surrounding data, and information of the location and movements of many UEs in the surrounding described by the surrounding data may be taken into account. For scheduling the transmissions to the different UEs, a respectively configured scheduling unit may be provided in the network element.

According to a further embodiment of the second aspect, the method further comprises determining on the basis of the local surrounding data and the location of the UE a proposed UE configuration with improved radio conditions; and transmitting to the UE a proposed configuration indication indicating the proposed UE configuration.

For example, according to a further embodiment of the second aspect, the method further comprises determining on the basis of the local surrounding data and the location of the UE a proposed position with improved radio conditions; and transmitting to the UE a proposed position indication indicating the proposed position.

According to a third aspect, a computer program is provided which is adapted for controlling the method according to the first aspect or an embodiment thereof when the computer program is executed by a data processor.

According to a fourth aspect, a computer program is provided which is adapted for controlling the method according to the second aspect or an embodiment thereof when the computer program is executed by a data processor.

According to a fifth aspect, a user equipment (UE) is provided, the UE comprising a location determining module for determining a location of the UE; and a location feedback module for feeding back the location of the UE to a network element.

According to embodiments of the fifth aspect, respective components of the UE are adapted for carrying out the method according to the first aspect or an embodiment thereof.

According to a sixth aspect, a network element is provided, the network element comprising a storage for storing a 3-dimensional local surrounding data describing a surrounding of the network element; a feedback receiving module for receiving from a UE a 3-dimensional location of the UE; and a channel state information determining module for determining a channel state information from the local surrounding data and the 3-dimensional location of the UE.

According to embodiments of the sixth aspect, respective components of the UE are adapted for carrying out the method according to the second aspect or an embodiment thereof.

It should be understood that details and embodiments of entities, e.g. the UE, the network element, the channel, the surrounding data, and details and embodiments of used terms, e.g. the term "location", are valid throughout this document and are not repeated for each aspect or embodiment.

In the following there will be described exemplary embodiments of the subject matter disclosed herein with reference to a method for operating a user equipment and a method for operating a network element. It has to be pointed out that of course any combination of features relating to different aspects of the herein disclosed subject matter is also possible. In particular, some embodiments have been described with reference to apparatus type claims whereas other embodiments have been described with reference to method type claims. However, a person skilled in the art will gather from the above and the following description that, unless other notified, in addition to any combination of features belonging to one aspect also any combination between features relating to different aspects or embodiments, for example even between features of the apparatus type claims and features of the method type claims is considered to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
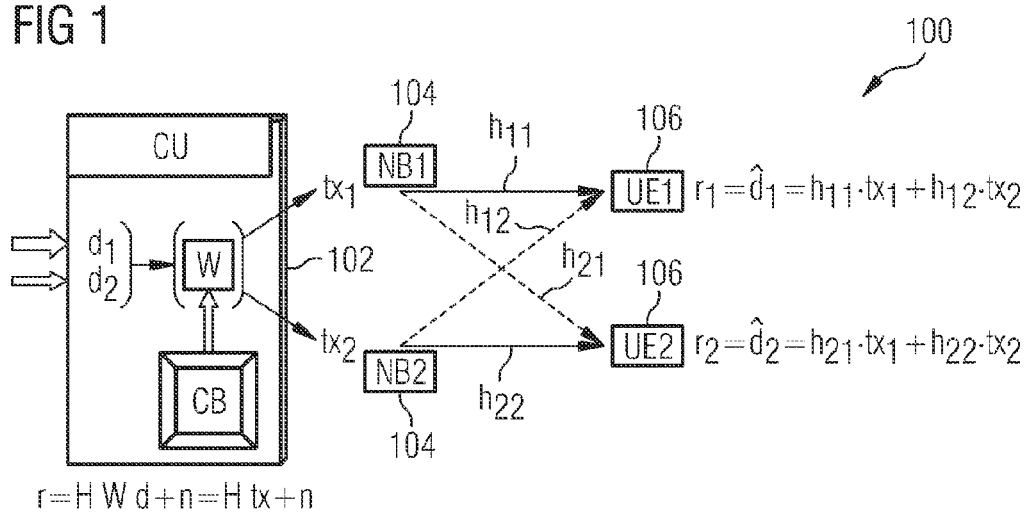
FIG. 1 shows a communication system having basic components of a cooperative transmission (COOPA) system.

The illustration in the drawings is schematic. It is noted that in different figures, similar or identical elements are provided with the same reference signs or with reference signs, which are different from the corresponding reference signs only within the first digit.

For cellular systems like 3GPP LTE (3GPP=Third generation partnership project; LTE=long term evolution; see 3GPP TS 36.300v800, March 2007) actually extensions to the current LTE Release 8 standard are discussed for future releases like LTE release 9 or IMT advanced. Some form of cooperative antenna systems (COOPA) has been proposed to overcome inter cell interference and to exploit improved radio channels (rank enhancement).

From theory significant performance gains with respect to capacity and coverage are known for full cooperating cellular radio systems compared to conventional ones. Due to these large gains, which cannot be achieved with other technologies, as it is known from theory that cooperative antenna systems provide an upper bound for interference limited cellular radio systems, makes it very likely that some type of cooperation will have to be implemented in future radio systems.

FIG. 1 shows a communication system 100 having basic components of a cooperative transmission (COOPA) system. Different types of cooperative antenna systems (COOPA) have been proposed in the meantime, but a so called cooperation area (CA), consisting of two cooperating eNBs and two UEs as illustrated in FIG. 1, is the basis of any COOPA system.

The central unit (CU) 102 of a CA performs common signal precoding, which is basically a matrix multiplication of all data signals $d_1$, $d_2$ with a precoding matrix W resulting in transmit signals tx1 and tx2 which are provided to the network elements (NB1 and NB2) 104, respectively. In case of zero forcing (ZF) W is the pseudo inverse H+ of the overall channel matrix H. The simplest form of a CA for a codebook based precoding is illustrated in FIG. 1. In this case the precoding matrix W is selected from a codebook CB based on the estimated radio channels between all involved UEs 106 and eNBs 104, e.g. using UL-DL reciprocity for TDD systems or by using explicit signalling by the UEs UE1 and UE2. Generally the vector of receive signals r (having components r1 and r2 in the example of FIG. 1) are obtained by r=H W d+n=H tx+n, where H is the channel matrix, including the components h11, h12, h21 and h22 in the example of FIG. 1, W is the precoding matrix;

d is the data vector, including the components d1, d2 in the example of FIG. 1; and n is a noise vector describing the noise of the system.

The optimal precoder is calculated as a function of the channel state information (CSI). However, since CSI is in general only available at the receiver (UE1, UE2), it needs to be fed back to the transmitter (NB1, NB2, CU).

Especially for higher number of eNBs and UEs—each having several antenna elements—the number of radio channels, which have to be estimated and fed back from UEs to eNBs might be quite large, resulting in accordingly high feedback overhead. According to an embodiment shown in FIG. 1, FDD systems are assumed, requiring explicit feedback of DL CSI, but TDD systems may also benefit in case of reciprocity errors, specific interference conditions or in case of small/no UL data traffic. Feedback overhead can be seen as one of the main challenges for COOPA systems and requires therefore special attention.

Channel estimation for broadband mobile radio systems is generally a challenge due to a large time variance and frequency selectivity of the radio channels in case of fast moving UEs. In case of COOPA systems, where a coherent precoding of data signals from different transmission sites is intended the challenge is even higher due to the higher number of radio channels as well as the required high accuracy with respect to the CSI estimates.

In frequency division duplexing (FDD) systems—under the assumption of a proper CSI estimation based on reference signals (RS) at the UEs—there is the requirement to feed back this CSI information from all UEs to all eNBs. Depending on the mobile speed this feedback will have to be updated regularly and quite often, leading to a high feedback data rate.

As additional drawback, feedback of CSI information might take several subframes, i.e. there will be typically a latency of few to several ms, leading to outdated channel information at the eNBs. This might result in significant performance degradation in COOPA systems due to outdated precoding matrices W.

Generally herein, a novel and extremely powerful technique will be proposed, promising a significant further reduction over conventionally known feedback reduction schemes.

In particular, one goal of an embodiment of the herein disclosed subject matter is to minimize feedback overhead for COOPA systems applying full coherent precoding techniques based on accurate CSI information. However, those skilled in the art will recognize from the herein disclosed subject that the invention is not limited to following exemplary embodiments or to COOPA systems, but is widely applicable to any system that requires feedback of channel state information.

The main idea of the herein disclosed subject matter is to feed back from UE to the network elements (eNBs) instead of the radio channel itself an accurate UE location, e.g. an accurate 3 dimensional UE location.

Figure 2:
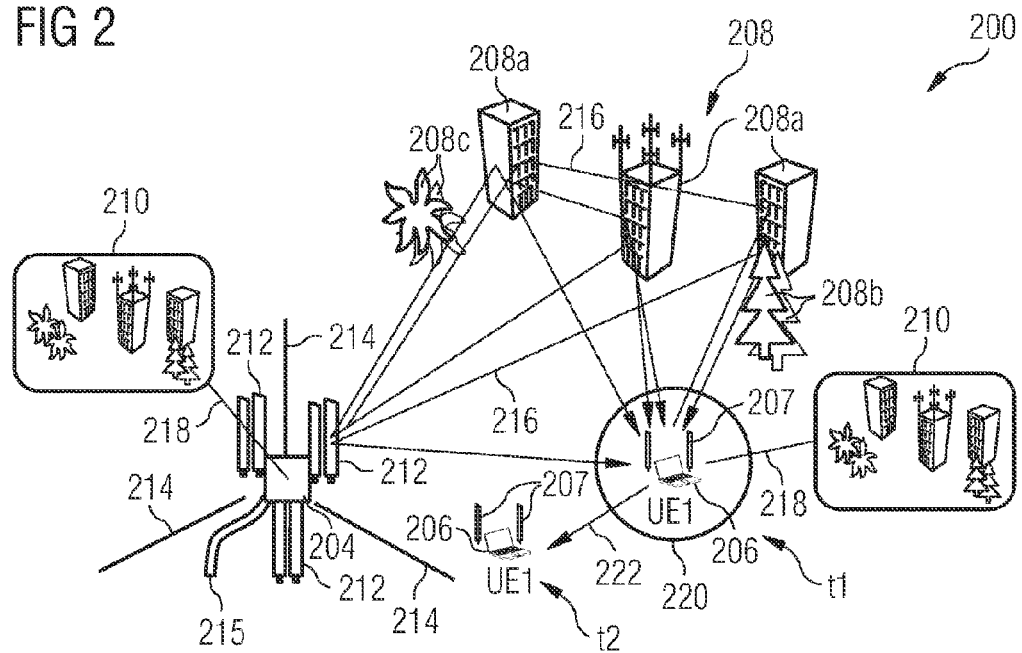
FIG. 2 shows a communication system according to illustrative embodiments.

FIG. 2 illustrates a communication system 200 in accordance with illustrative embodiments of the herein disclosed subject matter. Of the communication system 200 of FIG. 2, one network element 204 in the form of an e-nodeB (eNB) and one user equipment 206 (UE1) is shown. Antenna elements of the UE1 are indicated at 207 The exemplary eNB 204 comprises three antenna sets 212, one for each sector associated with the eNB 204. Sector boundaries of the sectors are indicated at 214 in FIG. 2. However, other configurations are also possible. Typically an eNB communicates with radio network controllers and/or other eNBs via communications lines, indicated at 215 in FIG. 2. As eNBs are located at fixed positions they can easily have a perfect knowledge of their surrounding 208 in form of respective surrounding data 210, e.g. accurate 3D vector building data of all surrounding buildings 208a as well as trees 208b or other fixed obstacles 208c.

In case the location of an UE 206 together with the building vector data 210 is known by the eNB 204 it can easily calculate the overall resulting channel impulse response by well known raytracing algorithms. In addition it has to be assumed that the antenna patterns of the UE 206 as well as of the eNB 204 is known. According to an embodiment, the UE 206 comprises a pattern indicator, e.g in the form of a respectively designed software module, for indicating the antenna pattern of the UE 206 to the eNB 204, e.g. during connection setup. Indicating the antenna pattern to the eNB 204 may be performed e.g. by transmitting a respective message to the eNB 204.

In case the UE feeds back additionally a moving vector (MV) information, the eNB will be able to perform a prediction of the radio channel over a larger time period.

A challenge is the accurate estimation of the UE position, which has to be a fraction of a wavelength of the RF frequency. In case of a 2.6 GHz frequency the wavelength λ is just 0.11 meters (m). If the maximum phase error should be smaller than 5° this will require a location accuracy of less than 0.0016 meters or 1.6 millimeters (mm). GPS based location will be typically worse to that and other well known location algorithms will have even worse performance.

For that reason it is proposed to combine GPS based localisation with a ray tracing based method using the 3D vector building data as mentioned above.

The overall solution, according to embodiments, is illustrated in FIG. 2 and contains following steps:

a) in first step the eNB broadcasts 3D local building vector data map 210 (BVDM) of its surrounding as a combination of measured pre stored data+adaptive learning corrections in regular manner, e.g. every second. The adaptive learning corrections are e.g. done based on the UE feedbacks and take care of varying car traffic, varying foliage conditions in different seasons etc.

b) All UEs receive and store this local BVDM. Lines 218 in FIG. 2 indicate that the BVDM 210 is stored in the UE 206 as well as in the eNB 204. While UEs move they may add further BVDMs from other eNBs, thereby enlarging their overall view of their surrounding. Similar to navigation systems these 3D building vector data might be also loaded into the UE in advance e.g. based on a CD or over an internet access.

c) as in conventional systems the eNB broadcasts common reference signals RSs.

d) Based on the common RSs the UEs estimate the CSI evolution over time.

e) Based on GPS the UE 206 places itself in an area 220 of the BVDM, defining a coarse position of the UE 206, e.g. with an accuracy of 10 m×10 m.

f) The UE 206 compares the estimated CSI with that of a raytraced CSI and determines the location within the 10×10 $m^2$ area where the mean square error (MSE) between estimated and calculated power delay profiles (PDPs) is minimized. For this calculation the UE includes its known effective antenna pattern. For this purpose the UE might perform a raytracing on a grid of possible locations and selects in the end the one with the smallest MSE deviation. But this leads probably to a large processing overhead. More directly will be the calculation based on the main paths of the channel impulse response. As the main location is already known it is possible to identify the main multipath components, some of which are indicated at 216 in FIG. 2 and its reflections at the surrounding, e.g. the buildings 208a. Delay differences between the estimated and the measured path delays allow to directly calculate the correct position.

g) The UE 206 feeds back the best fitting UE position as calculated above. Nearby located persons might lead to additional shadowing effects and inaccuracies of the reflection model might lead to further deviations of the location based estimate of the CSI with that of the really measured CSI. For that reason it is proposed to send additionally difference data, e.g. delta CSI information dCSI, concerning e.g. moving objects not included in basic BVDM. The eNB can take this information additionally to update its BVDM map, so that dCSI might be reduced in the future.

h) Additionally the UE 206 feeds back the best fitting moving vector 222, containing estimated speed and direction, derived from the evolution of the CSI over the past. As typical movements of a UE can be seen as a series of piecewise linear movements and the linear movement will be typically quite large compared to a subframe length, this embodiment of prediction promises significant feedback reduction. In FIG. 2, the UE

206 is shown in at two different times, indicated at t1 and t2, wherein the movement is described by the moving vector 222.

i) The eNB 204 recalculates the CSI and its evolution (prediction for long time periods) as seen by the UE based on fed back UE position, BVDM model, on the moving vector and on dCSI.

j) Based on many dCSI feedback the eNB 204 can optimize its BVDM model.

k) As a further improvement the eNB 204 may use the UL channel for estimation of further UE movements and combine this with its prediction from i). This improves CSI estimation accuracy as well as allows increasing the possible prediction time.

Figure 3:
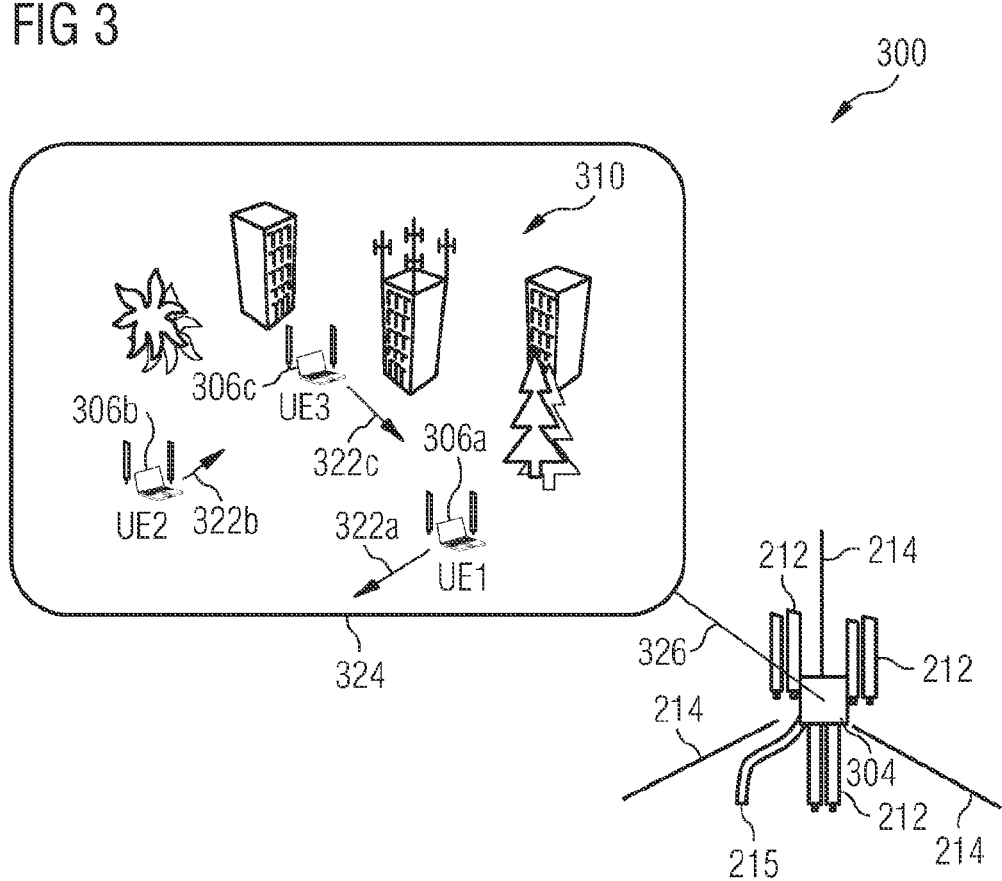
FIG. 3 shows a communication system according to illustrative embodiments.

FIG. 3 shows a communication system 300 according to illustrative embodiments of the herein disclosed subject matter. A network element 304 of the communications system 300 is similar to the network element 204 of FIG. 2. Identical elements are indicated with identical reference signs, the description of which is not repeated here. According to an embodiment, the network element 304 stores the UE locations of all UEs 306a, 306b, 306c of which the locations are known to the network element 304. According to an embodiment, also the moving vectors 322a, 322b, 322c of all UEs are stored by the network element. Hence, according to an embodiment, the network element 304 stores an overall map 324 containing all UE positions and their moving vectors. Line 326 in FIG. 3 indicates that map 324 is stored in the network element 304. According to an embodiment, the map 324 includes the surrounding data indicated at 310. According to a further embodiment, the map 324 including the surrounding data 310 forms adapted surrounding data, which may be further processed and used as described herein.

The proposed concept can be seen as parameterized information transfer, where the parameter extraction is the location information of the UE. For parameterization a common model at transmitter as well as receiver side is required, which is in this case the surrounding data, i.e. the 3D building vector model.

In the following some issues related with the implementation of the proposed algorithm are discussed:

a) Broadcasting of the BVDM can be done slowly while the UE moves from one eNB to the next. As future radio systems will provide broadband data rate the relative overhead for broadcasting of this information will be small even so the absolute amount of data might be relatively large. Alternatively the BVDMs might be loaded in advance e.g. over the internet.

b) The UEs should have a knowledge about their antenna patterns to improve the location estimation.

c) Most challenging are nearby shadowing obstacles like moving persons etc. Here techniques as known from astronomy might be used, where some paths are damped by obstacles. As long as a set of main multipath components can be identified it is sufficient to define the location. Anyway it is not so important to really find the real position of the UE but to find a position which fits best to the estimated CSI at the UE.

d) The UE has to apply some raytracing algorithms, which require typically quite large processing time. The combination with the GPS based positioning should help to reduce the raytracing algorithm to the dominant multipath components, which can be selected on the rough location in advance. As explained above the method is a parameterized information reduction, relying on a model—here the BVDM. According to other embodiments, simplified models taking care of the relevant dominant multipath components with minimum processing requirements are used instead of the BVDM.

e) Tracking at the UE will additionally help to reduce processing overhead as after one accurate UE position has been found the evolution of some dominant multipath components should be enough to follow the UE movements.

f) 3D building vector models are already available for many locations either for raytracing simulations or for network planning and might be reused.

g) A rough estimation of the required position accuracy reveals that a position accuracy in the order of milimeter should be typically sufficient for good performance. Assumed GPS provides a 10 m×10 m accuracy, this position information requires about 14+14+14 bit. At the same time a UE moving with 10 m/s would require 1 second to move a distance of 10 m. With a communication system in accordance with illustrative embodiments, prediction over 10 m seems to be unrealsistic while about 10 cm seems to be possible. In that case we need the position information every 10 ms, so every 10 ms a position update. In case of 1 mm accuracy this needs less than 8+8+8 bit every 10 ms.

The following advantages can be expected from illustrative embodiments of the herein disclosed subject matter:

There will be significant reduction over best state of the art feedback algorithms due to the parameterization of the broadband CSI information into a single UE position. The difficulty of conventional prediction algorithms is that the prediction is blind about its surrounding and can only do the prediction based on the past evolution of the CSI information. In contrast, for the proposed method there is a known model together with the knowledge of the further movement of the UE over a relatively large time. This allows prediction with high accuracy over large time periods. Therefore the feedback rate can be reduced by factors while maintaining high CSI accuracy.

The second important feedback reduction issue is that one position generates the full CSI for the full broadband radio channel. So assumed a very good vector building model even a factor of 1000 smaller feedback overhead might be possible over best state of the art feedback schemes.

If the position information is a 3D position, also reflections from ground have to be taken care of.

Due to large prediction times based on the moving vectors with good accuracy the issue of feedback delay can be overcome, just by adapting the transmission time with that of the eNB based channel prediction time. In addition, prediction helps cell edge users in bridging coverage holes.

Figure 4:
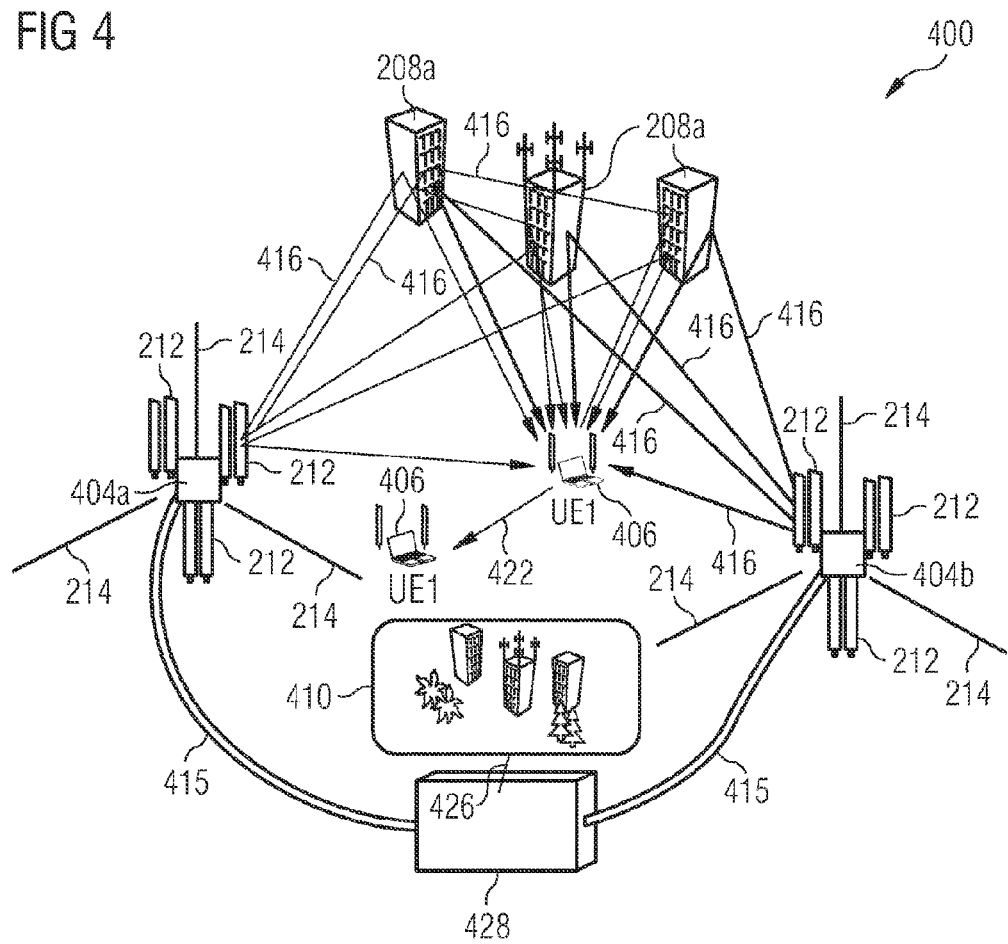
FIG. 4 shows a communication system according to illustrative embodiments.

FIG. 4 shows a communication system 400 in accordance with illustrative embodiments of the herein disclosed subject matter. Elements which are similar or identical to elements of the communication system 200 of FIG. 2 are indicated by the same reference signs and the description of these elements is not repeated here. Of communication system 400, two network elements 404a, 404b in the form of eNBs and one user equipment 406 (UE1) are shown. The UE 406 is shown in two positions (corresponding to two different times) which are related to each other by the moving vector 422. According to an embodiment, at least two network elements 404a, 404b are configured for inter-network-element cooperation. For example, as shown in FIG. 4, the at least two network elements may be connected to a common network unit 428, e.g. to a radio network controller (RNC), by respective connections 415a, 415b. The connection 415a, 415b may be a wired connection or a wireless connection, for example.

According to an embodiment, the common network element 428 generates a multi-element-surrounding data 410, e.g. a building vector data map that covers more than the range of one network element. According to an embodiment, the multi-element-surrounding data 410 is stored in the network element 428, indicated at 426. Such multi-element-surrounding data 410 are shared among the interconnected network elements 404a, 404b.

According to another embodiment, the inter-network-element cooperation is used to communicate the location of a UE among at least two network elements. In this way, the required overall feedback resource for feeding back the location of the UE to the network elements is reduced. This is possible since according to embodiments of the herein disclosed subject matter, the channel state can be estimated for any network element from the respective surrounding data and the location of the UE.

Hence, FIG. 4 illustrates a further advantage for COOPA systems, i.e. in best case one single UE position will give the information for all radio channels involved in the cooperation area, some of which are indicated at 416. This leads to a further significant feedback reduction, even so some correction terms dCSIs for each radio channel might be required.

It should be noted, that the inter-network-element cooperation does not necessarily include a physical element 428. For example, two or more network elements may be directly interconnected among each other, e.g. via an X2-interface.

The eNBs will have the information of the location and movements of many UEs in its BVDMs. This provides completely new options for optimum UE scheduling, as the eNB can find optimum scheduling possibilities which will be in the future. So if the eNB 'sees' that a UE will have significant better channel conditions in the near future it might delay data transmission for this UE till the UE reaches this better channel conditions.

Further embodiments of the herein disclosed subject matter deal with the coverage, which is a major issue due to shadowing and due to outdoor to indoor penetration loss. Many effort has been spent to increase the spectral efficiency as well as coverage by means like opportunistic multi user scheduling, MIMO and many other schemes. All these schemes are basically trying to improve performance based on the eNB as well as user constellations as they are.

What is left out in known approaches is that the user might be willing to help to improve the overall radio conditions actively, specifically, if he profits in terms of faster data connections or lower battery power consumption.

However, with known devices, e.g. in houses with bad coverage, users sometimes learn by try and error after some time at what places of their house or living place there might be a good coverage.

Users are already today accepting and prepared to change their location to go to these preferred places, even if these places might be outdoor or one has to change the floor of the building.

People new to a building are not able to learn from earlier experiences so it might be very difficult for them to find the best spot for a communication. Additionally there is no good fine granular criteria which would allow them to find the best place fast and with good accuracy.

The goal of some embodiments of the herein disclosed subject matter is to optimize overall radio network performance by active help of the users. For that purpose they are provided with accurate information about radio performance in their nearby surrounding. Naturally, this information or service is only an free offer of the mobile network operator (MNO), which might be used by an end user or not.

Taking into account that improved channel conditions will help users to save precious battery power as well that networks will benefit from increased average channel conditions for all users, there is also a high potential for energy saving in the context of 'green radio'. This is especially true as some UEs in very bad channel conditions typically require the highest effort for data transmission.

The main idea of the following embodiments is to reuse and enhance the knowledge of the user location as being achieved by the model based feedback reduction scheme. Embodiments of this model based feedback scheme rely basically on a ray-tracing model of the surrounding of an eNB. This ray tracing model is continuously but slowly updated by analysis of the UE feedbacks.

For UEs entering the cell the eNBs broadcast regularly the newest surrounding data in the form of a ray tracing model to all UEs.

The UE find their rough location with the help of GPS, which is in second step significantly improved by exploiting the channel measurements to an accuracy of a centimeter (cm) or even less.

All UEs are feeding back this location information to the eNB so that the eNB has a very accurate knowledge about all positions of all UEs within its cell.

So far the proposal is in line with embodiments presented above.

According to further embodiments, the next step is that the network element searches for all UEs for places providing significant better radio conditions and informing UE about possibly better locations. According to an embodiment, specifically cell edge UEs are informed about possibly better locations. The network element might even take multi user interference or MIMO related issues like channel rank into account to optimize the overall cell performance. In one step further two or more network elements might even exchange information to find a common overall multi cell optimum.

It should be noted that herein the ray tracing model, i.e. the surrounding data may fully describe the surrounding or only parts thereof, e.g. only the main buildings. However, the more details are included in the model, the more precise will be the channel estimation and the proposed UE configuration.

Probably only few UEs will move to the proposed new locations. According to an embodiment, regular updates of the location change hints are calculated by the network elements and transmitted to the UEs.

According to an embodiment, the location proposals with better radio channel conditions are transmitted to each UE over a specific control channel. According to a further embodiment, the location proposals with better radio channel conditions are transmitted to each UE over the physical downlink shared channel (PDSCH) as application data. However, other channels are also possible. According to a further embodiment, the application software at the UEs will read their location hints and display them for the user for example as arrows or in the form of colour marked radio conditions in the near vicinity.

Additionally the eNB might give hints for antenna constellation updates, which might provide specifically for MIMO transmission higher performance.

It then depends on the user how far he wants or can follow the hints. According to an embodiment, the user can decide how far hints are shown or not on the display. But often he might be happy to know the status of his current radio transmissions and about the options to improve the conditions.

Figure 5:
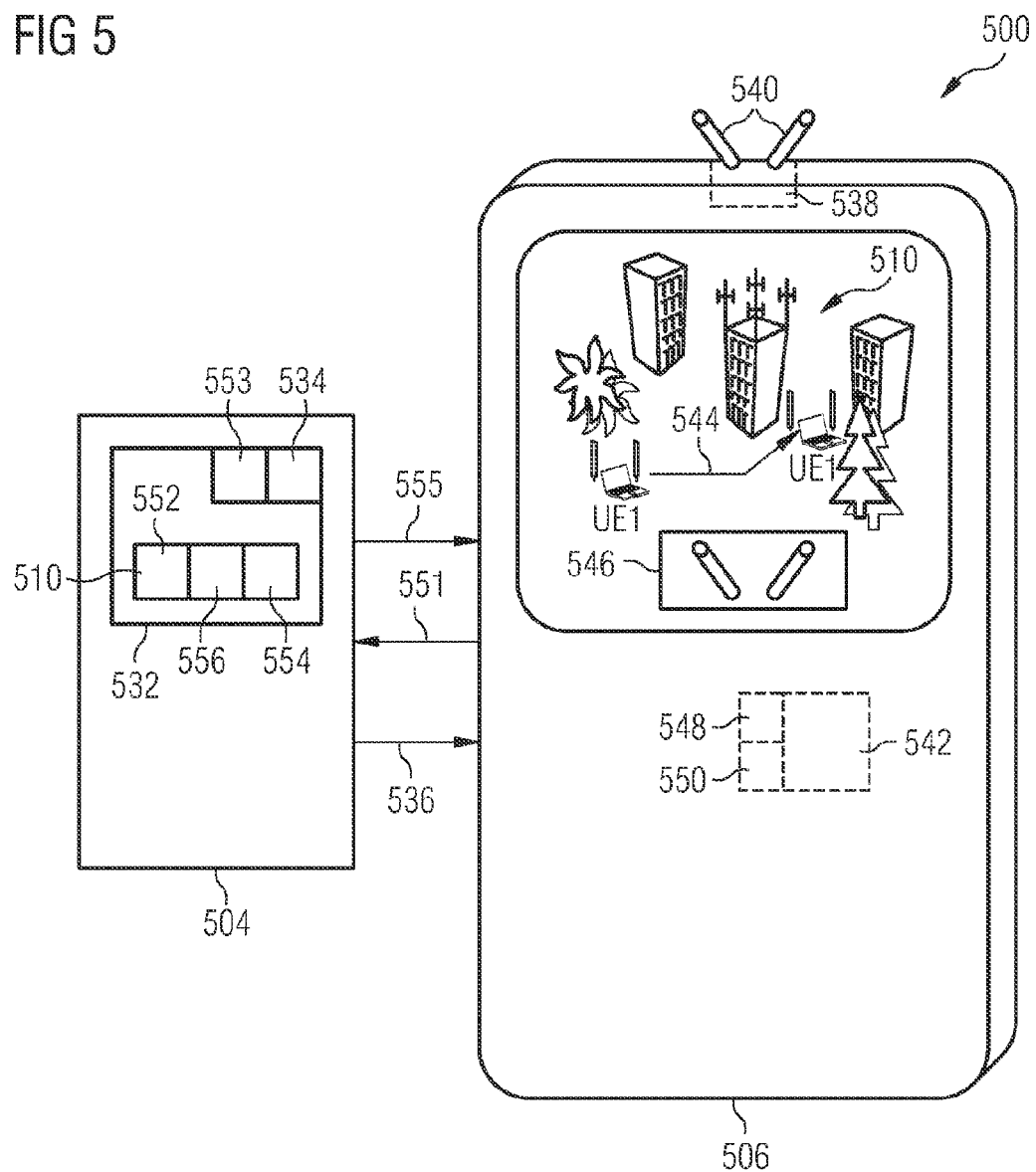
FIG. 5 shows a communication system according to illustrative embodiments.

The overall solution is illustrated in FIG. 5 and, according to an illustrative embodiment, contains following steps:

a) The network element, e.g. an eNB, as well as the UE have accurate knowledge of UE position and antenna configuration, e.g. based on in build navigation system plus model based channel estimation.

b) Based on this information the network element determines (e.g. searches) for better UE configuration, e.g., according to respective embodiments, for at least one of: better UE positions with better radio channel conditions; an optimized antenna configuration; an optimized antenna position; an optimized antenna setup; and optimized times for better radio conditions, e.g. due to lower load conditions in the cell.

c) Based on this information the network element (or the network elements in the case of two or more network elements) inform the UEs of the better UE configuration, e.g. better position and/or better antenna configuration and/or better antenna position and/or better antenna setup and/or better communication time. In response hereto, the UE indicates to the user the better UE configuration, e.g. the better UE position, for instance by displaying respective arrows. The user indication of the better UE configuration informs the user that by moving accordingly, e.g. according to the proposed arrows on the display, and/or by accordingly adapting the antenna configuration/position/setup, and/or by delaying a data transmission there would be a significant higher performance, mainly due to better radio channel conditions. The better radio conditions may be for example due to significant less path loss or less channel correlation in case of MIMO transmission.

d) The user can than decide whether it is possible or worth to follow the proposal, e.g. change the location as proposed by the network element or whether he prefers to use the present conditions.

e) The network element might also provide a map of the radio conditions for the nearby environment. This would allow the user to make its decision based on possible gains as well as suitability of the location.

f) In cases where the network element determines optimized communication times, according to an embodiment, shifting data transfers to proposed times is awarded with some price benefits.

The proposed concept of indicating to a user better radio conditions according to one or more of the above mentioned embodiments provides following advantages:

a) The users are getting active help from the network element, which is beneficial e.g. in case that the UE is suffering from coverage problems or in case that the user is seeking for maximum performance.

b) In contrast to other solutions, active relocation of UEs by human persons opens a new field for overall system performance optimization of the overall system performance.

c) Since according to an embodiment the user can switch on and off this supporting function, he is not urged to move to a new location but is supported in case of, e.g., bad radio channel conditions.

d) The user as well as the mobile network operator will profit from actively optimized radio conditions. As UEs have to transmit with significantly higher signal power in coverage holes, there should be significant battery power savings possible. From a system perspective cell edge UEs with bad coverage largely determine the overall system performance. So here is also performance gain possible combined with possible energy savings. The energy savings, which are getting more and more important are related to less Tx power and less complex processing schemes in case of lower loaded or more effectively used radio cells.

FIG. 5 shows a communication system 500 according to illustrative embodiments of the herein disclosed subject matter. The communication system 500 comprises a network element 504 and a UE 506. The network element 504 comprises a processing unit 532 having implemented thereon, e.g. by means of a respective software module, a UE configuration search unit for determining a proposed UE configuration with better radio conditions. Further, the network element comprises a configuration transmitter 534 for transmitting a proposed UE configuration to the UE 506, in accordance with embodiments described above. Transmittance of the proposed UE configuration to the UE 506 is indicated at 536 in FIG. 5.

The UE 506 is configured for receiving the configuration information indicating the proposed UE configuration, e.g. by a respective receiver 538 and associated antenna 540. According to an embodiment, the receiver 538 and the antenna 540 are also used for the desired communication between the network element 504 and the UE 506. The UE 506 further comprises a processing unit 542 for processing the configuration information and respectively indicating to a user the proposed configuration. In the exemplary embodiment shown in FIG. 5, the proposed UE configuration comprises a proposed location, indicated by arrow 544 in FIG. 5, and a proposed antenna configuration, visually indicated at 546 in FIG. 5. According to a further embodiment, the UE is configured for displaying a representation of the surrounding data, commonly indicated at 510 in FIG. 5.

It should be understood that the examples and embodiments in FIG. 5 and the other Figures FIG. 1 to FIG. 4 are provided for illustrative purposes only, and not for limitation.

According to embodiments of the invention, any function of the network element or of the UE may be realized by a respective component of the network element or the UE, respectively. According to further embodiments, components of the communication system, e.g. of the network element or of the UE are provided in the form of respective computer program products which enable a processor to provide the functionality of the respective elements as disclosed herein. According to other embodiments, any component of the communication system, may be provided in hardware. According to other—mixed—embodiments, some components may be provided in software while other components are provided in hardware.

For example, the UE-related steps described herein, e.g. UE-related steps of a) to k) described with regard to FIG. 2, may be executed by a respective processing unit of the UE, e.g. the processing unit 542 of the UE 506 described with regard to FIG. 5. Similar, the network element related steps described herein may be executed in a processing unit of the network element, e.g. the processing unit 532 of the network element 504 shown in FIG. 5. Further, the above described embodiments imply for example the UE comprising a location determining module 548 for determining a location of the UE and a location feedback module 550 for feeding back the location of the UE 506 to the network element 504, indicated at 551 in FIG. 5. Further, the above described embodiments imply for example the network element comprising a storage 552 for storing a local surrounding data 510 describing a surrounding of the network element 504, a broadcasting module 553 for broadcasting (indicated at 555) the local surrounding data 510 to UEs 506, a feedback receiving module 554 for receiving from the UE 506 a location of the UE, and a channel state information determining module for 556 determining a channel state information from the local surrounding data 510 and the location of the UE 506.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

Further the examples and embodiments should not be construed as limiting the scope of the claims. Further, many variations are possible without leaving the scope of the appended claims. For example, alternatively or additionally to visually indicating to a user the proposed UE configuration, audio indicating is also possible, e.g. for indicating a proposed UE location.

In order to recapitulate the above described embodiments of the present invention one can state:

The proposed methods and devices provide a new technique for feeding back CSI information of a channel between a network element and a user equipment to the network element by feeding back a location of the user equipment. The new technique opens completely new options for multi user scheduling and channel prediction. According to embodiments, a proposed user equipment configuration is indicated to the user by the user equipment.

LIST OF REFERENCE SIGNS 100, 200, 300, 400, 500 communication system
102 central unit
104, 204, 304, 404a, 404b, 504 network element
106, 206, 306a, 306b, 306c, 406, 506 user equipment (UE)
208a building
208b tree
208c fixed obstacle
210, 310, 410, 510 surrounding data
212 antenna set
214 sector boundary
215, 415a, 415b connection
216 multipath component
218 indication for "stored in"
220 area of coarse position
222, 322a, 322b, 322c, 422 moving vector
324 overall map
326, 426 indication for "stored in"
428 common network unit
532 processing unit of the network element
534 configuration transmitter
536 transmittance of proposed UE configuration
538 receiver
540 antenna
542 processing unit of the UE
544 arrow indicating proposed UE position
546 indication of better antenna configuration
548 location determining module
550 location feedback module
551 transmittance of UE location
552 storage
553 broadcasting module
554 feedback receiving module
555 broadcasting
556 channel state information determining module

The invention claimed is:

1. Method of operating a user equipment (UE) in order to enable a network element to determine channel state information (CSI) of a communication channel between the UE and the network element, the method comprising:
   receiving regularly broadcasted local surrounding data;
   determining a location of the UE;
   transmitting the location of the UE to the network element; and
   receiving a proposed configuration of the UE with better radio conditions based on the determined channel state information, where receiving the proposed configuration is a scheduled reception from the network element based upon a temporal prediction of channel state information from the local surrounding data, the location of the UE and a moving vector containing an estimated speed and direction of the UE.

2. Method according to claim 1, further comprising:
   determining a coarse position of the UE; and
   determining the location of the UE on the basis of the location surrounding data, where the local surrounding data described a surrounding of the coarse position.

3. Method according to claim 2, further comprising:
   determining an estimated CSI based on reference signals received by the UE;
   determining a raytraced CSI by a ray tracing method taking into account the local surrounding data; and
   determining the location of the UE as the location for which the difference between the estimated CSI and the raytraced CSI is minimal.

4. Method according to claim 2, further comprising:
   determining an delay of reference signals received by the UE;
   calculating a signal delay due to reflections on the surrounding defined by the local surrounding data; and
   determining the location of the UE from the differences between the determined delay of reference signals and the calculated signal delay.

5. Method according to claim 2, further comprising:
   receiving the local surrounding data from the network element.

6. Method according to claim 1, further comprising:
   transmitting the moving vector to the network element.

7. Method according to claim 1, further comprising:
   determining a comparison value of a quantity, by taking into account the location of the UE;
   measuring a value of the quantity;
   determining difference data defining the differences between the measured value and the comparison value of the quantity; and
   transmitting the difference data to the network element.

8. Method according to claim 1, further comprising:
   receiving from the network element a proposed configuration information indicating a proposed configuration of the UE with better radio conditions; and
   indicating the proposed configuration to a user.

9. Method of operating a network element, the method comprising:
   regularly broadcasting, by the network element, local surrounding data;
   receiving from a UE a location of the UE;
   determining a channel state information from the local surrounding data and the location of the UE;
   transmitting, by the network element to the UE, a proposed configuration of the UE with better radio conditions based on the determined channel state information; and
   determining a temporal prediction of channel state information from the local surrounding data, the location of the UE and a moving vector containing an estimated speed and direction of the UE.

10. Method according to claim 9, the method further comprising:
    altering the local surrounding data on the basis of feedback data received from the UE.

11. Method according to claim 9, further comprising:
determining a proposed configuration of the UE with improved radio conditions from the local surrounding data and the location of the UE; and
transmitting to the UE a proposed configuration indication indicating the proposed configuration.

12. A non-transitory computer program which is adapted for controlling the method as set forth in claim 1 when being executed by a data processor.

13. User equipment (UE) comprising:
a receiver for receiving regularly broadcasted local surrounding data;
a location determining module for determining a location of the UE;
a location feedback module for feeding back the location of the UE to a network element,
where the receiver is further for receiving a proposed configuration of the UE with better radio conditions based on the determined channel state information, where the proposed configuration is a scheduled reception from the network element based upon a temporal prediction of channel state information from the local surrounding data, the location of the UE and a moving vector containing an estimated speed and direction of the where UE is configured to change a configuration based upon the proposed configuration based upon the temporal prediction.

14. Network element comprising:
a broadcasting module for regularly broadcasting local surrounding data;
a storage for storing a local surrounding data describing a surrounding of the network element;
a feedback receiving module for receiving from a UE a location of the UE; and
a channel state information determining module for determining a channel state information from the local surrounding data and the location of the UE,
where the broadcasting module is further for transmitting a proposed configuration of the UE with better radio conditions based on the determined channel state information; and
where the network element comprises at least one process or and at least one memory and a computer program, where the at least one processor the at least one memory and the computer program are configured to:
schedule transmissions to different UEs by taking into account a temporal prediction of the channel state receiving by the feedback receiving module, where the temporal prediction of channel state information is based upon the local surrounding data, the location of the UE and a moving vector containing an estimated speed and direction of the UE.

15. Method according to claim 1, where the location of the UE is a three dimensional location of the UE.

16. Method according to claim 1, further comprising: indicating an antenna pattern of the UE to the network element.

17. Method according to claim 1, where the UE comprises an antenna pattern and where determining the location of the UE is based at least in part on the antenna pattern.

18. Method according to claim 9, further comprising: receiving, by the network element, an indication of an antenna pattern of the UE.

19. Method according to claim 9, further comprising: in response to determining that the temporal prediction of the channel state information is better than the determined channel state information, delaying a data transmission.

* * * * *

UNITED STATES PATENT AND TRADEMARK OFFICE
CERTIFICATE OF CORRECTION

PATENT NO.         : 8,532,677 B2
APPLICATION NO.    : 13/144190
DATED              : September 10, 2013
INVENTOR(S)        : Ruediger Halfmann et al.

It is certified that error appears in the above-identified patent and that said Letters Patent is hereby corrected as shown below:

In the Claims

In Claim 2:
Column 16, line 13, "described" should be deleted and --describes-- should be inserted.

In Claim 13:
Column 17, lines 24-25, "the where UE is" should be deleted and --the UE, where the UE is-- should be inserted.

In Claim 14:
Column 18, lines 8-9, "process or" should be deleted and --processor-- should be inserted.
Column 18, line 14, "receiving" should be deleted and --received-- should be inserted.

Signed and Sealed this
Twenty-sixth Day of November, 2013

Margaret A. Focarino
*Commissioner for Patents of the United States Patent and Trademark Office*